Patented Oct. 11, 1927.

1,645,390

UNITED STATES PATENT OFFICE.

KENNETH P. MONROE, OF PENNS GROVE, NEW JERSEY, ASSIGNOR TO E. I. DU PONT DE NEMOURS & COMPANY, OF WILMINGTON, DELAWARE, A CORPORATION OF DELAWARE.

PROCESS OF MAKING TETRA-ALKYL LEAD.

No Drawing.    Application filed April 19, 1924.   Serial No. 707,581.

This invention relates to the process of producing lead tetra-alkyl, particularly lead tetra-ethyl, by reaction between a lead-sodium alloy, an alkyl-halide, and a neutral hydroxylic compound capable of reacting with said sodium with evolution of hydrogen in the presence of a catalyst of the type used in the Grignard synthesis.

Catalysts which are especially suitable for use in my invention are substances containing a tertiary basic nitrogen atom, for example dimethylaniline, diethylaniline, pyridine, triethylamine, etc.

The character of the hydroxylic compound or mixture of compounds capable of reacting with sodium and the manner in which said compound or mixture is used are the aspects of the above-outlined tetra-alkyl lead synthesis with which the present invention is chiefly concerned. Water and an alcohol such as ethyl alcohol are good examples of substances which will react with sodium with formation of nascent hydrogen, and these substances can be used, to a certain extent, alternatively. The use of water is, naturally, preferable to the use of alcohol because of its being less expensive; it is also easily diluted (and its reaction with sodium thereby moderated) by dissolving therein a salt. I have discovered, however, that water alone, even when suitably diluted and used in the optimum proportions, does not permit of obtaining the yields of tetra-alkyl lead which can be obtained when water is used in conjunction with a substance, such as ethyl alcohol, which can increase the miscibility of the water in the other liquid reactants, and thereby render it more readily available in the reaction.

As was pointed out in some of my co-pending applications, the synthesis of lead tetra-alkyls from lead-sodium alloy and alkyl halide probably occurs in steps which may be represented by the following equations:

(1) $Pb + xAlkHlg \rightarrow PbAlk_xHlg_y$ (2) $Na + ROH \rightarrow NaOR + (H)$ (3) $PbAlk_xHlg_y + (H) \rightarrow Pb(Alk)_2 + 2H\ Hlg$ (4) $NaOR + HHlg \rightarrow NaHlg + ROH$ (5) $2Pb(Alk)2 \rightarrow Pb(Alk)_2 + Pb$ This theory of the reaction is founded, in part, upon the observation that as the reactants are rigorously purified and the content of water, alcohol or other dissolved hydroxylic compound approaches zero as a limit, the yield of lead tetra-alkyl approaches zero as a limit also. On the other hand the presence of an excessive amount of alcohol, water or other dissolved hydroxylic compound is undesirable inasmuch as undue side reaction (for example, the evolution of hydrogen) follows. Although the alcohol and water are, within limits, as hereinbefore indicated, mutually replaceable, I observed that when lead tetra-alkyls were manufactured by processes of the type described in my co-pending application Ser. No. 596,514, filed Oct. 23, 1922, namely, by the addition of water in a diluted form to an alkyl halide and lead-sodium alloy (particularly, in the presence of a catalyst of the type known to catalyze the Grignard reaction) it was essential to standardize the alcohol content of the reactants (particularly, of the alkyl halide) in order to obtain uniformly high yields and insure completion of the reaction within a given time. For example, when lead tetra-ethyl was manufactured by gradual addition of magnesium chloride solution to ethyl bromide in the presence of pyridine as a catalyst, a higher yield (for example, 85% of theory) was obtained when the ethyl bromide contained, initially, 1% alcohol by volume, than when alcohol-free ethyl bromide was used (for example, 65% of theory). This I ascribe tentatively to the fact that although alcohol is miscible in all proportions with ethyl bromide, water is soluble only to a very limited extent in pure ethyl bromide and is therefore available only to the extent afforded by its slight concentration in the oily reaction phase. The presence of even a small amount of alcohol increases the solubility of water in ethyl bromide very markedly and therefore functions in a twofold manner, serving as a source of hydrogen per se, and also making available a higher concentration of water in the zone of reaction. It is obvious that although this effect of alcohol is, within limits, desirable in accelerating the synthesis of lead tetra-ethyl, the presence of an excessive amount of alcohol is undesirable inasmuch as it is attended by undue evolution of hydrogen. For example, the use of ethyl bromide containing 10% alcohol by volume is attended by excessive side reaction and a lowered yield (for example, 60% of theory).

It is obvious that in view of this discovery the most economical production of lead tetra-alkyls by processes such as described in my co-pending application, Ser. No. 596,514, filed Oct. 23, 1922, must involve in practice, standardization of the alcohol content of the alkyl halide. This may be accomplished (for example) by addition of a fixed amount of alcohol to ethyl bromide from which the alcohol has been rigorously removed by suitable treatment (for example, washing with 95% sulfuric acid and subsequent neutralization). The alcohol may be added entirely at the beginning of the reaction or in portions concurrently with the aqueous magnesium halide solution. The amount added and the manner of addition may be adjusted to conform with the exigencies of the manufacturing program; for example, it may not be desirable always to operate at the highest known chemical efficiency when the addition of more alcohol facilitates larger production by accelerating the reaction.

The invention may be illustrated by the following comparative examples:

(1) 200 g. lead-sodium alloy containing 14.6% sodium was placed in a 1 liter round flask fitted with reflux condenser and containing 250 cc. very pure ethyl bromide from which the alcohol had been removed by exhaustive washing with 95% sulfuric acid, followed by neutralization and water washing. 20 cc. pyridine were added, the flask was immersed in a thermostat maintained at 30–35° C. and ½ cc. saturated aqueous magnesium chloride solution was added at hourly intervals for 40 hours. The excess ethyl bromide and lead tetra-ethyl were then removed by steam distillation. A yield of lead tetra-ethyl corresponding to 60% of that required by theory was obtained.

(2) 200 g. lead-sodium alloy containing 14.6% sodium was placed in a 1 liter round flask fitted with reflux condenser and containing 250 cc. very pure ethyl bromide from which the alcohol had been removed by exhaustive washing with 95% sulfuric acid, followed by neutralization and water washing. 20 cc. pyridine and 1¼ cc. 2B (denatured) alcohol were added, the flask was immersed in a thermostat maintained at 30–35° C. and ½ cc. saturated aqueous magnesium chloride solution was added at hourly intervals for 40 hours. The excess ethyl bromide and lead tetra-ethyl were then removed by steam distillation. A yield of lead tetra-ethyl corresponding to 85% of the theoretical yield was obtained.

(3) 200 g. lead-sodium alloy containing 14.6% sodium was placed in a 1 liter round flask fitted with reflux condenser and containing 250 cc. very pure ethyl bromide from which the alcohol had been removed by exhaustive washing with 95% sulfuric acid, followed by neutralization and water washing. 20 cc. pyridine and 2½ cc. 2B alcohol were added, the flask was immersed in a thermostat maintained at 30–35° C. and ½ cc. saturated aqueous magnesium chloride solution was added at hourly intervals for 40 hours. The excess ethyl bromide and lead tetra-ethyl were then removed by steam distillation. A yield of lead tetra-ethyl corresponding to 85% of the theoretical was obtained.

(4) 200 g. lead-sodium alloy containing 14.6% sodium was placed in a 1 liter round flask fitted with reflux condenser and containing 250 cc. very pure ethyl bromide from which the alcohol had been removed by exhaustive washing with 95% sulfuric acid, followed by neutralization and water washing. 20 cc. pyridine and 25 cc. 2B alcohol were added, the flask was immersed in a thermostat maintained at 30–35° C. and ½ cc. saturated aqueous magnesium chloride solution was added at hourly intervals for 40 hours. The excess ethyl bromide and lead tetra-ethyl were then removed by steam distillation. A yield of lead tetra-ethyl corresponding to 65% of the theoretical yield was obtained.

Although I have described my invention with more particular reference to the joint use of water and ethyl alcohol as the hydroxylic mixture which is to react with the metallic sodium, it will be understood that my invention includes broadly the use of water in conjunction with a substance, which is capable of rendering the water more miscible (soluble) in the liquid reactants required for the tetra-alkyl lead synthesis than is pure water, or water containing diluent salts in solution, in the absence of said substance. Such aqueous mixtures of increased miscibility in the alkyl halide, when used in the aforesaid synthesis, improve the progress of the reaction as well as the yield.

In practice, I prefer to use an aqueous salt solution in conjunction with ethyl alcohol, but upon occasion I may use in place of ethyl alcohol other alcohols such, for example, as methyl, iso-propyl, or butyl alcohol, such alcohols, as well as water, being designated by the expression "neutral hydroxylic material"; or I may use a non-hydroxylic compound such as pyridine, always of course in conjunction with water or a water solution. The total proportion of neutral hydroxylic material present may vary to some extent with the particular hydroxylic material and the particular halide employed, but should usually be less than 4%, and preferably between 0.4% and 4% when the alkyl halide is ethyl bromide, and especially when the neutral hydroxylic material is ethyl alcohol and water whenever the alkyl halide is other than ethyl bromide, and the alcohol is other than ethyl alcohol the weights taken are such that the molecular ratios of alkyl halide to alcohol and to water are the same as in the example given covering ethyl bromide and ethyl alcohol.

In place of the ethyl bromide in the above-described synthesis, I may use ethyl chloride. Various other changes may also be made without departing from my invention.

I claim:

1. The process of producing a tetra-alkyl lead from a lead alloy and an alkyl halide, which comprises treating one atomic proportion of lead, alloyed with not more than two atomic proportions of a monovalent element capable of liberating hydrogen from water, with an alkyl halide and water in conjunction with a substance capable of increasing the miscibility of said water in the liquid phase of the reaction mixture.

2. The process of producing a tetra-alkyl lead from a lead alloy and an alkyl halide, which comprises treating one atomic proportion of lead, alloyed with not more than two atomic proportions of a monovalent element capable of liberating hydrogen from water, with an alkyl halide and water in conjunction with a substance capable of increasing the miscibility of said water in the liquid phase of the reaction mixture, and in the presence of a catalyst of the type used for the Grignard synthesis.

3. The process of producing a tetra-alkyl lead which comprises inducing a reaction between a lead-sodium alloy with a sodium content not higher than that corresponding to the formula $PbNa_2$, an alkyl halide, and water in the presence of a substance capable of increasing the miscibility of the water in said alkyl halide, and in the presence of an organic substance containing a tertiary basic nitrogen atom, the total proportion of neutral hydroxylic material present depending upon the particular halide employed, and being between about 0.4 and 4% based on the weight of said alkyl halide, when the halide is ethyl bromide.

4. A process as set forth in claim 1 in which there is also used as a catalyst an organic substance containing a tertiary basic nitrogen atom.

5. A process as set forth in claim 1 in which the total proportion of neutral hydroxylic material present is less than 4% based on the weight of the alkyl halide.

6. A process as set forth in claim 3 in which the substance capable of increasing the miscibility of the water is another normally liquid neutral hydroxylic compound.

7. A process as set forth in claim 3 in which the substance capable of increasing the miscibility of the water is a normally liquid alcohol.

8. The process of producing tetra-ethyl lead which comprises inducing a reaction between a lead-sodium alloy with a sodium content not higher than that corresponding to the formula $PbNa_2$, ethyl bromide, and water, in the presence of another hereindescribed neutral hydroxylic material capable of increasing the solubility of the water in ethyl bromide, and in the presence of an organic catalyst containing a tertiary basic nitrogen atom, the total proportion of neutral hydroxylic material present, including water, being between about 0.4 and 4% based on the weight of ethyl bromide used.

9. A process as set forth in claim 8 in which the substance capable of increasing the solubility of the water is another normally liquid neutral hydroxylic compound.

10. A process as set forth in claim 8 in which the substance capable of increasing the solubility of the water is a normally liquid alcohol.

11. A process as set forth in claim 8 in which the substance capable of increasing the solubility of the water is ethyl alcohol.

12. A process as set forth in claim 8 in which the water has a salt dissolved therein to moderate the reaction between said water and the sodium.

13. The process of producing tetra-ethyl lead which comprises inducing a reaction between a lead-sodium alloy having a sodium content not higher than that corresponding to the formula $PbNa_2$, ethyl bromide, and water saturated with magnesium chloride, in the presence of ethyl alcohol and of dimethylaniline, the proportion of water and alcohol used, taken together, being between 0.4 and 4% based on the weight of the ethyl bromide used.

In testimony whereof I affix my signature.

KENNETH P. MONROE.